Nov. 8, 1927.
W. V. N. POWELSON ET AL
1,648,423
EQUIPMENT FOR MOORING AND BERTHING AIRSHIPS OVER WATER
Filed Sept. 21, 1921      5 Sheets-Sheet 1
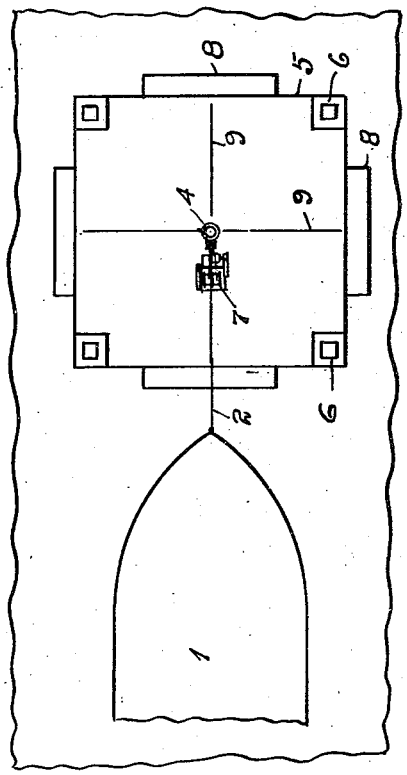
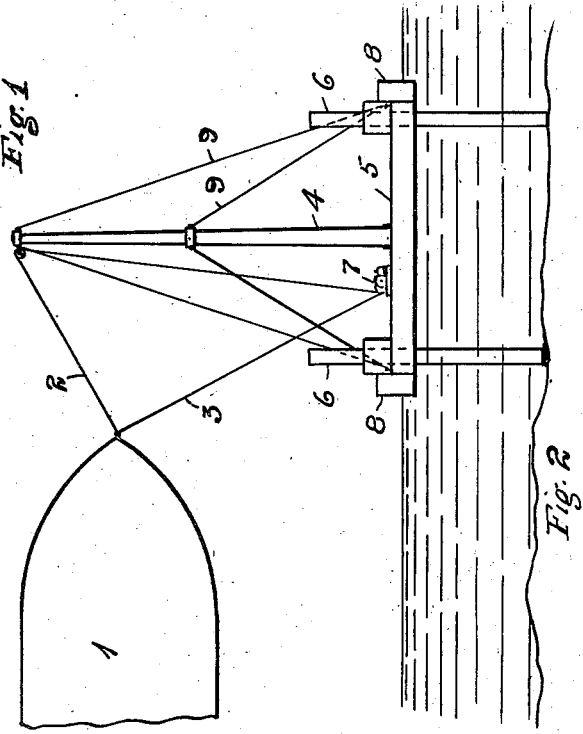
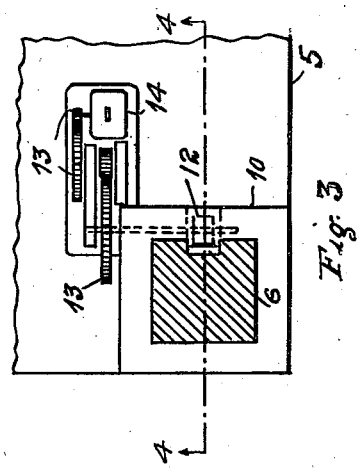
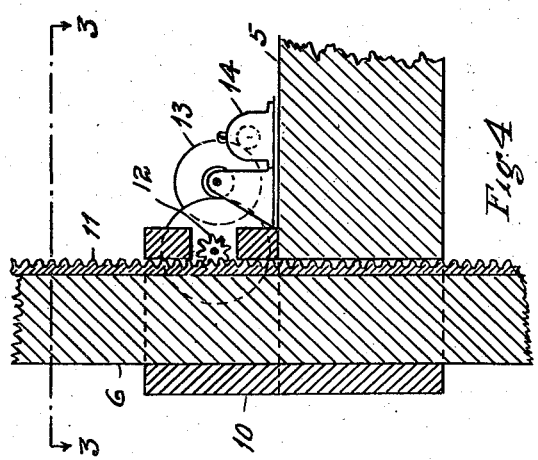
INVENTORS:
WILFRID V.N. POWELSON
WARREN TRAVELL
BY Mitchell, Chadwick & Kent,
Attys.

Nov. 8, 1927.
W. V. N. POWELSON ET AL
1,648,423
EQUIPMENT FOR MOORING AND BERTHING AIRSHIPS OVER WATER
Filed Sept. 21, 1921 5 Sheets-Sheet 2
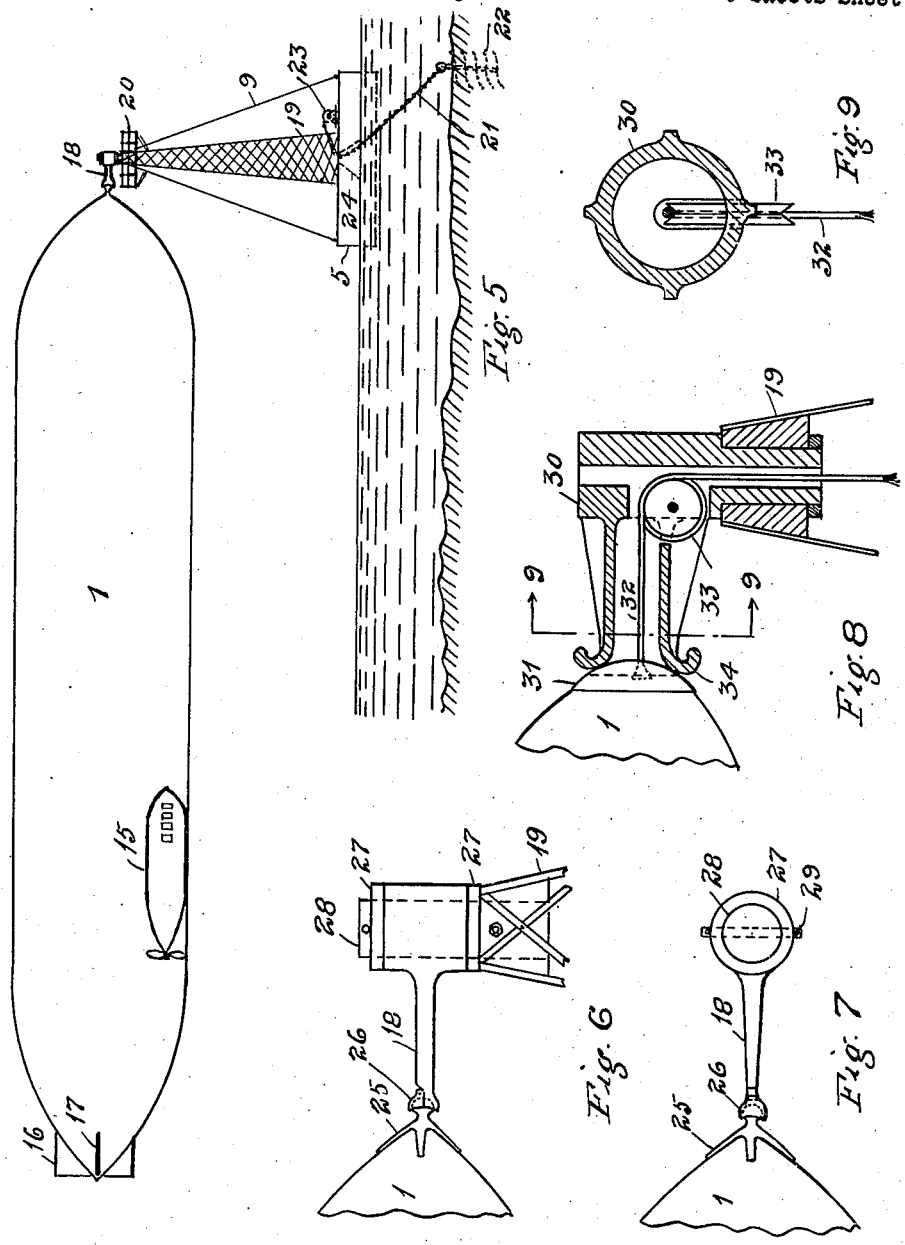
INVENTORS:
WILFRID V.N. POWELSON
WARREN TRAVELL
BY Mitchell, Chadwick & Kent
attys.

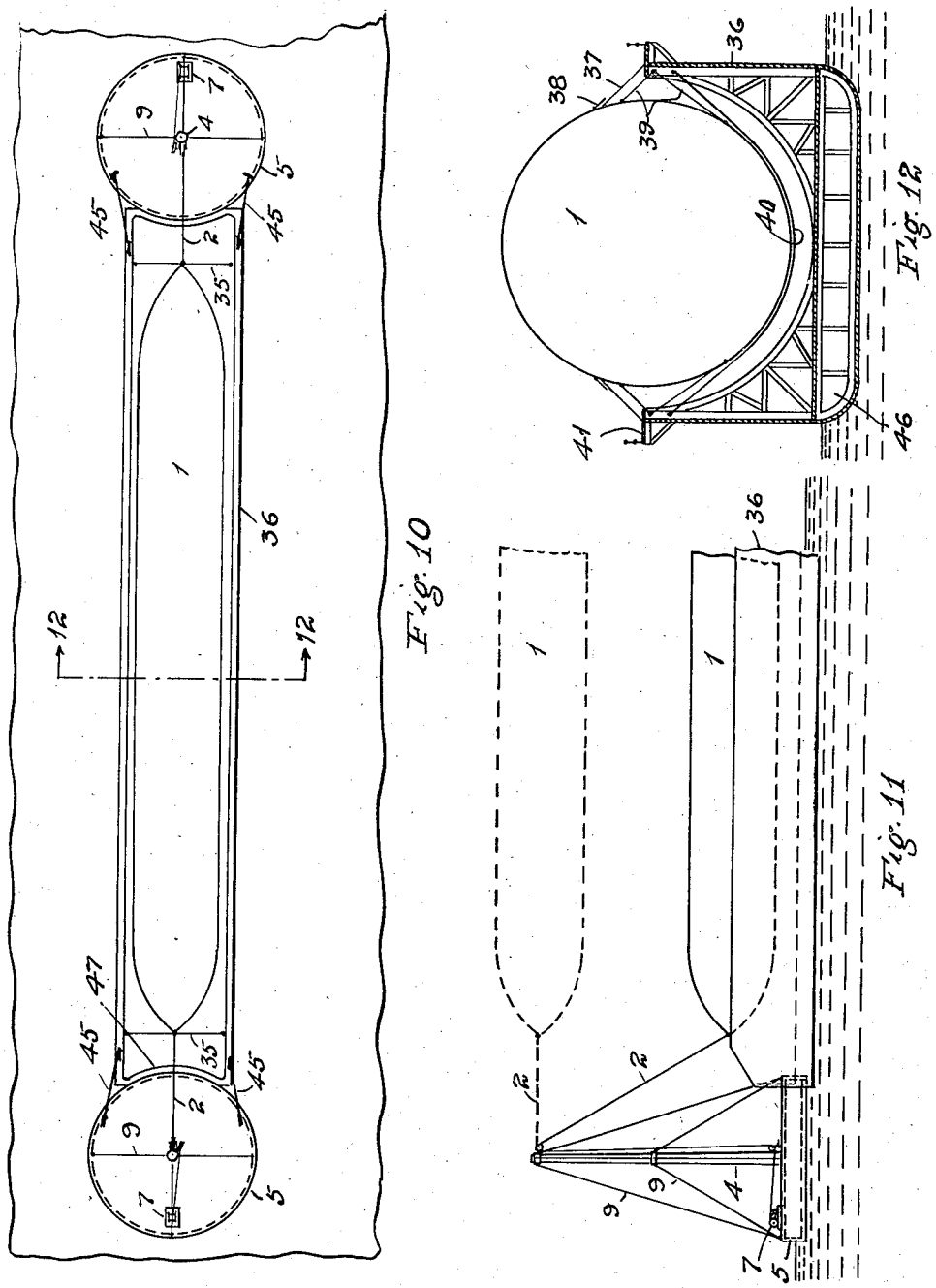

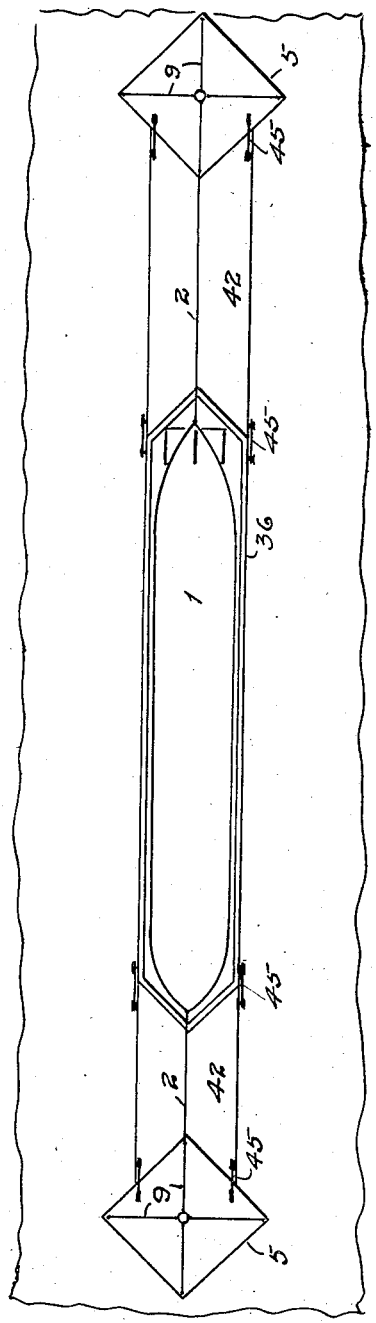
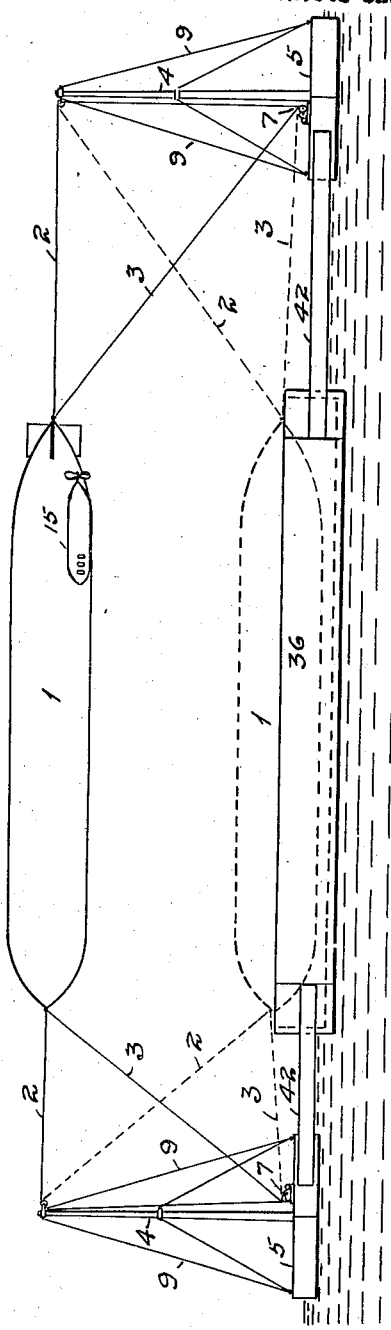

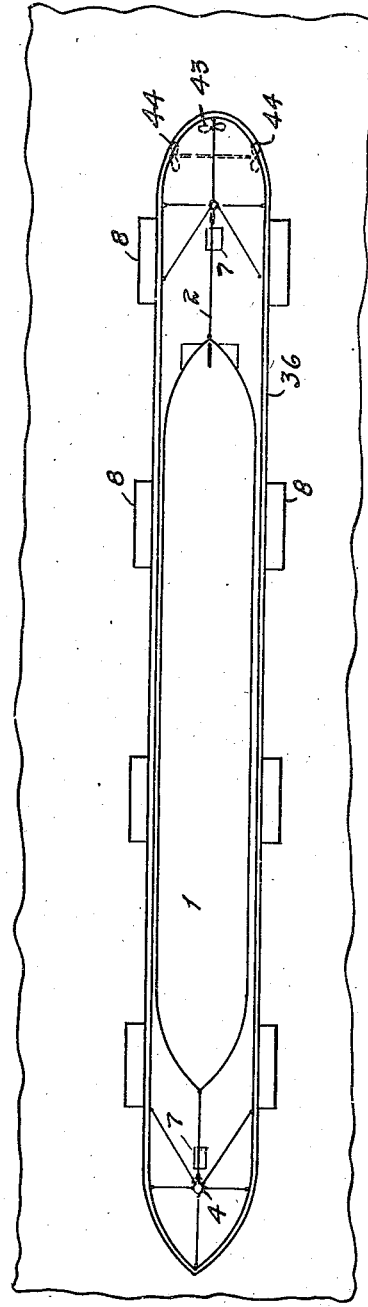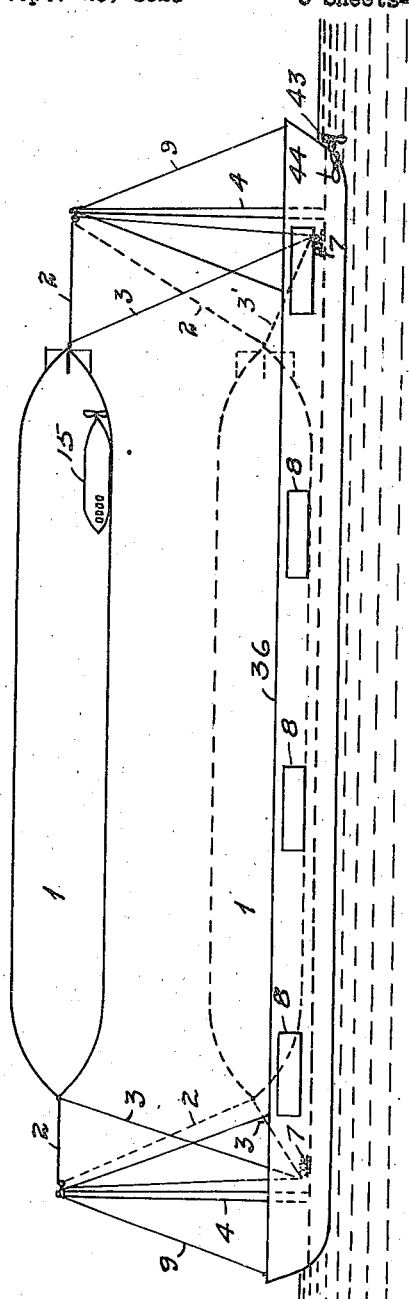

Patented Nov. 8, 1927.

1,648,423

UNITED STATES PATENT OFFICE.

WILFRID V. N. POWELSON AND WARREN TRAVELL, OF NEW YORK, N. Y.

EQUIPMENT FOR MOORING AND BERTHING AIRSHIPS OVER WATER.

Application filed September 21, 1921. Serial No. 502,128.

This invention relates to improvements in equipment for mooring and berthing airships over water.

In the art of operating airships as hitherto practiced, various attempts have been made to moor airships over water, but owing to the inadequacy of the equipment utilized, the attempts thus made were in general unsuccessful and, as a result, it is believed that the practice of mooring airships over water has been abandoned.

It is an object of this invention to provide means whereby airships may be safely and efficiently moored over water and whereby, while thus moored, they may be lowered under control to a secure position on board berthing vessels adapted to receive them. The invention further provides means for the safe launching of airships from said mooring means and berthing vessels.

To accomplish these objects, the invention provides a new type of mooring tower, which may ordinarily be a mast, the stability of which is increased by floating pontoons attached thereto, and by spuds extending to the surface of the ground beneath the water. By selecting or making a water area free from tides and ocean swell, perfect stability may thus be attained. The invention also provides means for attaching an airship to the mooring mast on a float, so that the airship may, while moored, swing freely around the mast, and provides for the anchoring of the mooring float so that if not standing on spuds or piles it may be swung about by tide and wind without fouling its under lines. For increasing safety two mooring floats may be used, to which the opposite ends of an airship are attached, and means provided for maintaining these floats the requisite distance apart. The invention also provides a new type of vessel for the berthing of airships, which may either carry the mooring masts or may be arranged in combination with two separate floats which carry the mooring masts. It is an advantage of this latter combination, that the length of the berthing vessel may be materially reduced by the use of floating spacers between the ends of the berthing vessel and the two mooring floats respectively.

There may be roof or covering over the berthing vessel, which roof comprises the upper portion of an airship when berthed on the vessel, and strips of weather-proof material extending between this upper portion of the airship and the sides of the vessel. A suspension cradle is also provided in connection with the berthing vessel, in which cradle the airship may be securely fastened and may rest without injury to itself or the berthing vessel.

The means provided for safely lowering an airship into its cradle on a berthing vessel while moored and for raising it therefrom may be similar to that described by us in connection with towers on land in a separate application for patent on "apparatus for the mooring and housing of airships" Serial No. 502,127. To further increase the safety of the mooring of airships over water, we propose to use in this connection certain improvements for the stabilization of airships, some of which are specified in the above mentioned patent application and others in a separate application for patent on airships Serial No. 498,605. Both of these applications pending coincidently herewith, contain generic claims on these said devices.

In the practical application of the invention thus set forth, various devices may be employed in substitution for those which are herein shown as illustrating the principles involved; and variations may be made in many respects without departing from the invention. It is intended that the patent shall cover by suitable expression in the patent claims whatever features of patentable novelty exist in the invention disclosed, except as aforesaid.

In the accompanying drawings:

Fig. 1 shows a plan view of a floating mast equipped with pontoons and spuds.

Fig. 2 is a side elevation of same.

Fig. 3 is a plan view on a larger scale showing a spud in section and mechanical means for the raising and lowering thereof.

Fig. 4 is an elevation of the same spud, in section on line 4—4 of Fig. 3.

Fig. 5 shows in elevation a float with a different type of mooring mast and an airship attached thereto by means of a revolvable arm having a universal joint at the point of its connection to the airship. This figure also shows means for anchoring the float through a central well in the float.

Fig. 6 is a side elevation on a larger scale of the mooring attachment shown in Fig. 5.

Fig. 7 is a plan view of same.

Fig. 8 is an elevation in section of a modification of the mooring attachment, wherein a concave receptacle is used into which the bow end of an airship fits.

Fig. 9 is an elevation of the same, on a larger scale, in section on line 9—9 of Fig. 8.

Fig. 10 shows in plan two circular mooring floats with a berthing vessel between.

Fig. 11 is a side elevation of a portion of same.

Fig. 12 is a cross-section, on a larger scale, on line 12—12 of Fig. 10.

Fig. 13 shows in plan two mooring floats, a berthing vessel and spacing floats intermediate between the floats and the vessel.

Fig. 14 is a side elevation of same.

Fig. 15 shows a plan view of a berthing vessel on which are located two mooring masts, having pontoons for increasing its stability. Side propellers are also shown for use in swinging about the stern of the vessel.

Fig. 16 is a side elevation of same.

Referring to the drawings, in Figs. 1 and 2, the airship 1 is fastened to the mooring mast 4 by means of two lines 2 and 3, leading from the bow of the airship around suitable sheaves to the power-operated hoist 7. The stability of the float is increased by means of pontoons 8, attached to the sides of the float. Its stability is further increased by the use of spuds extending to the surface of the ground beneath the float. Figs. 3 and 4 give details of the mechanical means for operating these spuds, 11 being a rack attached to a spud and 12 a pinion meshing with this rack. A motor 14 rotates this pinion through suitable intermediate gearing 13.

In Figs. 5, 6 and 7 the airship 1 is attached to the mooring mast 19 of a different design, located on the float 5, by means of a rigid connection 18 having a ball and socket joint 26, of which the bow end 25 of the airship forms a part. The rigid stem 18 terminates in a concave portion that constitutes the socket; and this is made of two parts the upper of which is removable to permit the insertion of the ball member on the prow 25. When returned to place and fastened it holds the ball securely. This ball and socket joint together with the revolving of the arm 18 about the center pin 26 of the mast permits free movement of the airship in any direction, at the same time maintaining the bow of the airship at a fixed distance from the mast.

In Figs. 8 and 9, the bow of the ship is fitted with a convex head-piece 31, to which the mooring rope is attached as indicated diagrammatically. In the mooring operation the rope 32 draws the head-piece against and partly into a concave receptacle 34 adapted for horizontal rotation about the center line of the mooring mast 19. If desired this rope attachment through a concave receptacle to a convex nose of the airship may be used with the ball and socket members of Figures 5, 6, 7, in which case the rope can be used to draw the ball into the socket. The attachment rope 32 leads around a sheave 33 suitably located at the top of the tower, and down along the center line of the mast to a winch which serves as control means, such as at 7 of Fig. 2.

In Figs. 10, 11 and 12 the airship 1 is shown resting in a suspension cradle 40, carried by a berthing vessel 36. The airship is held firmly in this position by fastening lines 35, 39, extending between the airship and the sides of the vessel. The upper portion of of the envelope of the airship, together with weather-proof strips of material 37, protect the lower portion of the airship and the interior of the berthing vessel from rain, snow, etc. Flashing strips 38 provide a weather-tight joint between these strips and the sides of the airship. Water-tight compartments 46 along the bottom of the hull may be filled partially or entirely with water to give increased stability to the vessel. The ends of the vessel are curved as at 47 to fit the circular mooring floats 5, which floats are equipped with masts and handling apparatus as previously described. Lines 45 fasten the floats and the vessel together. Dotted lines show the airship in its moored position over the berthing vessel.

In Figs. 13 and 14, the airship 1 is shown in moored position attached by burtoning lines 2, 3 to the mooring floats 5, 5. By paying out line 2, 2 and hauling in on lines 3, 3, the airship may be lowered under control to its position on the berthing vessel 36, located beneath. Spacing floats 42, 42 are provided, fitting the respective ends of the vessel and the mooring floats. These spacing floats may be of equal length, different lengths as shown, or compounded by placing two or more between the berthing vessel and a mooring float. By the use of such spacers the length of the berthing vessel necessary to be constructed may be considerably reduced; and a single set of equipment may be utilized for handling airships of differing lengths.

In Figs. 15 and 16, the berthing vessel 36 carries two mooring masts 4 located toward its bow and stern ends respectively, and is equipped with pontoons 8 for increasing its lateral stability. The details of its equipment for handling and berthing an airship may be as previously described. In order that such a berthing vessel may be maintained head-on to the wind when the tide is flowing in some other direction, it is provided at or near the stern with transverse propellers 44 by means of which the stern may be swung to one side or the other as desired.

We claim:—

1. In equipment for mooring airships over water, the combination of a floating berth; a mooring tower fixed adjacent thereto on a separate support; means securing the berth and tower in position relative to each other; and means for mooring an airship to said tower movably between an upper position floating in air and a berthed position floating on water.

2. In equipment for mooring airships over water, the combination of a float having buoyancy and stability and with horizontal cross-sections of such shape that the length and width thereof are substantially the same in any cross-section; a tower thereon; ropes adapted to be attached to an airship, and extending therefrom upward to higher and downward to lower points on the tower, whereby, by pulling either rope and slacking the other rope an airship moored to said tower may be moved up or down under control.

3. In equipment for mooring airships over water, the combination of a plurality of floating vessels, one of which has a length approximating the length of the airship to be moored, and another of which has an upright mooring tower; there being means to secure the said two vessels together with the tower adjacent to the bow of the airship; and there being a second upright mooring tower on a floating support different from the support of the first, said second tower being at or adjacent to the stern of the said vessel which has approximately the length of the airship; and means for mooring an airship between these two towers.

4. In equipment for mooring airships over water, the combination as in claim 3 together with water-tight pontoons attached to the sides of said vessel which has approximately the length of the airship, increasing the stability thereof.

5. In equipment for mooring airships over water, the combination as in claim 3 together with means for swinging the stern of the vessel which has approximately the length of the airship around so that when the head end of an airship is moored to the bow tower and the airship floats in a direction therefrom determined by the wind, the vessel may be brought to a position under the airship for the mooring of its tail end to the stern tower.

6. In equipment for berthing airships over water, the combination of a floating vessel having its sides adapted to receive the lower portion of an airship between them, for berthing it, and strips of weather-proof material for covering the space between the upper sides of the berthed airship and the sides of the vessel.

7. In equipment for berthing airships over water, the combination of a floating vessel which has its upper portion adapted for the berthing of an airship, the covering over said berth comprising the upper surface of said airship and strips of weatherproof material bridging the spaces therefrom to the sides of the vessel.

8. In equipment for berthing airships over water, a composite mooring and berth comprising the combination of a floating vessel having its length equipment and width considerably greater than its depth; a mooring tower thereon; a second floating vessel having an end adapted to fit against the tower float and having its upper portion adapted to receive and berth said airship; means for connecting said floating berth and said floating tower together; and means for lowering said airship to its berthing position while moored to the tower.

9. In equipment for berthing airships over water, the combination of two floating vessels, each having their lengths and widths considerably greater than their depths; two mooring towers, one on each of said vessels, adapted for the mooring of an airship between them, a third floating vessel, having ends adapted to fit against the two tower vessels and its upper portion adapted for the berthing of said airship; means for fastening the berthing vessel between the two tower vessels; and means for lowering said airship to its berthing position while moored between said towers.

10. In equipment for berthing airships over water, the combination of two floats and two mooring masts, one on each of said floats, adapted for the mooring of an airship between them, a floating vessel having its upper portion adapted for the berthing of said airship; a spacer float between the berthing vessel and a tower float, keeping the two in line and a constant distance apart; means for fastening the berthing vessel, the spacing float, and the tower floats together in line with one another; and means for lowering said airship to its berthing position on the berthing vessel while moored between said towers.

11. In equipment for mooring an airship over water, a sectional support comprising a plurality of water-tight vessels connected together, one of which is independently capable of holding the end of the airship against horizontal stresses and another of which is capable of holding the body of the airship against gravity and other vertical stresses incident thereto.

12. In equipment for mooring airships over water, the combination of a float having buoyancy and stability; a tower thereon; mechanism for connecting said tower to an airship; means for shortening and lengthening the connection between said tower and said airship; a berthing float having buoyancy and stability; means for attaching the two floats together; supports resting upon the second float, onto which the airship may be lowered; and means for holding the airship in position on said supports.

13. The combination in claim 11 together with a berthing float having buoyancy and stability; means for attaching the two floats together; supports resting upon the second float, onto which the airship may be lowered; means for holding the airship in position on said supports and lateral propellers at the stern of the berthing float and power means applicable thereto, whereby the stern of the berthing float may be swung about so as to bring the berthing float to a position under an airship riding to the wind at the tower of a mooring float preparatory to lowering the airship onto the supports of the berthing float.

14. The combination in claim 3 together with power-operated lateral propellers at the stern of the vessel; whereby the stern of the vessel may be swung about so as to bring the vessel to a position under an airship riding to the wind with its head moored to the bow tower preparatory to fastening its tail end to the stern tower.

Signed at New York, N. Y., this first day of July, 1921.

WILFRID V. N. POWELSON.
WARREN TRAVELL.